US011630687B2

(12) United States Patent
Khare et al.

(10) Patent No.: US 11,630,687 B2
(45) Date of Patent: *Apr. 18, 2023

(54) COMPACTED CONTEXT STATE MANAGEMENT

(71) Applicant: Tahoe Research, Ltd., Dublin (IE)

(72) Inventors: Atul Khare, Portland, OR (US); Leena Puthiyedath, Portland, OR (US); Asit Mallick, Saratoga, CA (US); Jim Coke, Shingle Springs, CA (US); Michael Mishaeli, Zichron Yaakov (IL); Gilbert Neiger, Portland, OR (US); Vivekananthan Sanjeepan, Portland, OR (US); Jason Brandt, Austin, TX (US)

(73) Assignee: Tahoe Research, Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,664

(22) Filed: Feb. 20, 2018

(65) Prior Publication Data

US 2018/0276027 A1 Sep. 27, 2018

Related U.S. Application Data

(63) Continuation of application No. 14/076,341, filed on Nov. 11, 2013, now Pat. No. 9,898,330.

(51) Int. Cl.
*G06F 9/46* (2006.01)
*G06F 9/30* (2018.01)

(52) U.S. Cl.
CPC .......... *G06F 9/461* (2013.01); *H05K 999/99* (2013.01); *G06F 9/30003* (2013.01); *G06F 9/30043* (2013.01); *G06F 9/30101* (2013.01)

(58) Field of Classification Search
CPC .. G06F 9/461; G06F 9/30003; G06F 9/30043; G06F 9/30101; H05K 999/99
See application file for complete search history.

(56) References Cited

U.S. PATENT DOCUMENTS

| 4,484,274 | A | * | 11/1984 | Berenbaum | ............. | G06F 9/463 |
| | | | | | | 712/32 |
| 4,740,893 | A | * | 4/1988 | Buchholz | ............. | G06F 9/30036 |
| | | | | | | 708/520 |

(Continued)

FOREIGN PATENT DOCUMENTS

TW   200421178 A   10/2004

OTHER PUBLICATIONS

Intel® 64 and ia-32 architectures software developer's manual, vol. 3a, vol. 3A: System Programming Guide, Part 1, Jun. 2009, pp. 1-756 (Year: 2009).*

(Continued)

*Primary Examiner* — Meng Ai T An
*Assistant Examiner* — Willy W Huaracha
(74) *Attorney, Agent, or Firm* — Studebaker & Brackett PC

(57) ABSTRACT

Embodiments of an invention related to compacted context state management are disclosed. In one embodiment, a processor includes instruction hardware and state management logic. The instruction hardware is to receive a first save instruction and a second save instruction. The state management logic is to, in response to the first save instruction, save context state in an un-compacted format in a first save area. The state management logic is also to, in response to the second save instruction, save a compaction mask and context state in a compacted format in a second save area and set a compacted-save indicator in the second save area. The state management logic is also to, in response to a single restore instruction, determine, based on the compacted-save (Continued)

indicator, whether to restore context from the un-compacted format in the first save area or from the compacted format in the second save area.

15 Claims, 3 Drawing Sheets

(56) References Cited

U.S. PATENT DOCUMENTS

| | | | |
|---|---|---|---|
| 5,057,837 A * | 10/1991 | Colwell | G06F 9/30025 341/55 |
| 5,201,039 A * | 4/1993 | Sakamura | G06F 9/30101 711/201 |
| 5,414,864 A * | 5/1995 | Koizumi | G06F 12/1425 712/228 |
| 5,682,531 A | 10/1997 | Nakamura | |
| 5,974,512 A * | 10/1999 | Chiba | G06F 9/463 714/1 |
| 6,061,711 A | 5/2000 | Song et al. | |
| 6,205,543 B1 | 3/2001 | Tremblay et al. | |
| 6,209,085 B1 | 3/2001 | Hammond et al. | |
| 6,553,487 B1 | 4/2003 | Sukonik et al. | |
| 8,171,268 B2 * | 5/2012 | Newburn | G06F 9/461 712/228 |
| 8,631,261 B2 | 1/2014 | Van Dyke et al. | |
| 8,677,163 B2 | 3/2014 | Van Dyke et al. | |
| 9,792,125 B2 * | 10/2017 | Greiner | G06F 9/3834 |
| 2004/0111591 A1 * | 6/2004 | Arimilli | G06F 9/30116 712/228 |
| 2006/0149940 A1 | 7/2006 | Mukherjee | |
| 2007/0006231 A1 * | 1/2007 | Wang | G06F 9/3017 718/100 |
| 2007/0136733 A1 * | 6/2007 | Park | G06F 8/443 718/108 |
| 2008/0133898 A1 * | 6/2008 | Newburn | G06F 9/461 712/228 |
| 2009/0089562 A1 * | 4/2009 | Schuchman | G06F 1/3203 712/228 |
| 2013/0036426 A1 * | 2/2013 | Igura | G06F 9/48 718/108 |
| 2013/0111194 A1 * | 5/2013 | Grochowski | G06F 9/3851 712/228 |
| 2013/0219154 A1 * | 8/2013 | Van Dyke | G06F 9/30072 712/228 |
| 2014/0006758 A1 * | 1/2014 | Rotem | G06F 9/461 712/228 |

OTHER PUBLICATIONS

Intel® 64 and IA-32 architectures software developer's manual, documentation changes, Sep. 2013, pp. 1-228 (Year: 2013).*
AMD "AMD64 Technology Lightweight Profiling Specification" publication No. 43724 Rev. 3.08, Aug. 2010, pp. 1-62. (Year: 2010).*
Final Office Action from U.S. Appl. No. 14/076,341, dated Dec. 1, 2016, 18 pages.
Non-Final Office Action from U.S. Appl. No. 14/076,341, dated Mar. 11, 2016, 17 pages.
Notice of Allowance from U.S. Appl. No. 14/076,341, dated Oct. 20, 2017, 21 pages.
Office Action and Search Report from foreign counterpart Taiwan Application No. 103135189, dated Mar. 28, 2016, 7 pages.

* cited by examiner

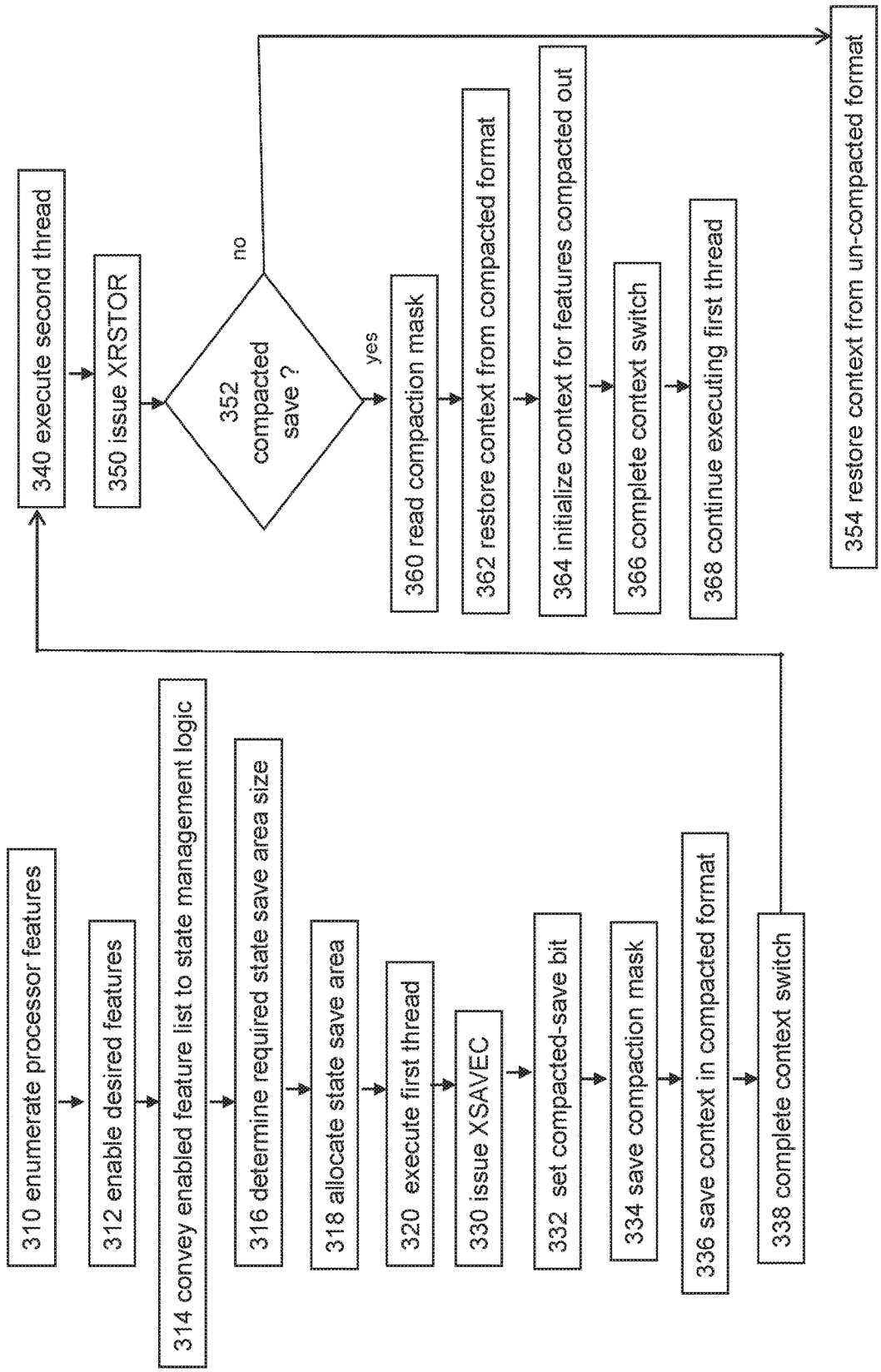

COMPACTED CONTEXT STATE MANAGEMENT

FIELD

Embodiments of the invention relate to microprocessor architecture. More particularly, embodiments of the invention relate to managing context state information within a microprocessor.

BACKGROUND

Modern microprocessors may perform numerous functions requiring a change of context state. For example, a microprocessor may change context state information when switching between groups of instructions, such as software threads. In changing between software threads, for example, context state of one group of instructions may be saved to a memory location and the context state of another group of instructions may be restored from memory and loaded into the microprocessor.

In reference to software threads, "context state" may refer to a portion of each software thread's state that is to be maintained between context switches within a processor. Context state may be stored in processor architectural registers, control registers, or other storage areas, such as memory. Context state is typically represented by a number of bits, the values of which define a particular context state.

The term "context switch" typically refers to a change from one processor execution state to another, such as a software thread switch. A context switch is typically performed either by the operating system or by a user's program. For example, a context switch may occur as a result of calling a subroutine within a user's program, in which the calling program's context is saved in a storage area when the call to the subroutine occurs, and restored from the storage area when returning from the called subroutine.

BRIEF DESCRIPTION OF THE DRAWINGS

Embodiments of the invention are illustrated by way of example and not limitation in the accompanying figures.

FIG. 3 illustrates a method for context state management according to an embodiment of the present invention.

DETAILED DESCRIPTION

Figure 1:
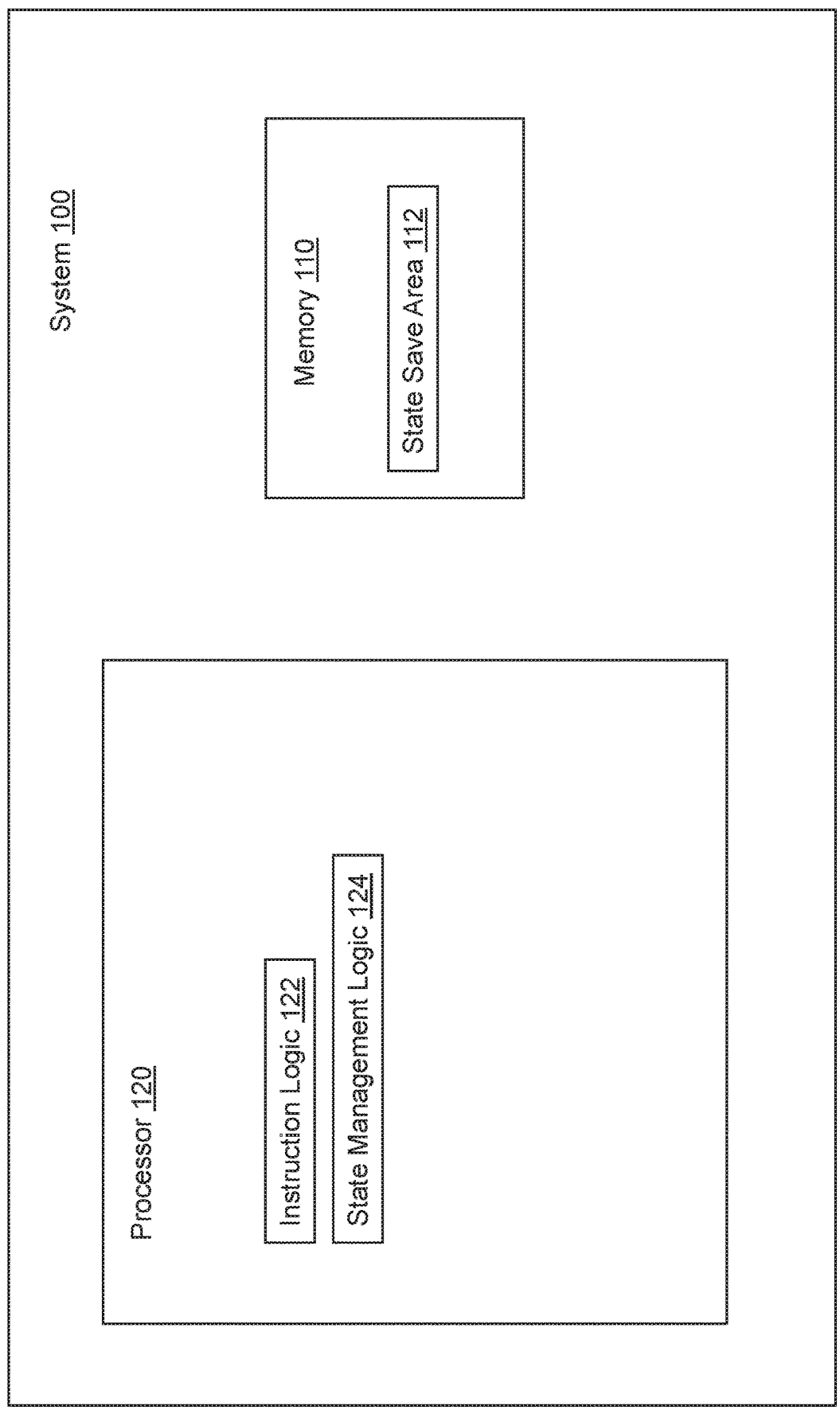
FIG. 1 illustrates a system, memory, and processor supporting context state management according to an embodiment of the present invention.

Embodiments of processors, methods, and systems for compacted context state management are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the specification and claims, unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location, or the content(s) thereof, in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

For convenience and clarity, various instructions may be described using particular names (e.g., XSAVE, XSAVEOPT, XRSTOR, XSAVEC, XSAVEOPTC, XSETBV, XGETBV), however, embodiments of the invention are not limited to those particular instructions as defined or used in any particular processor instruction set architecture. Other instructions and instruction names may be used within various embodiments of the present invention.

Embodiments of the invention pertain to microprocessor architecture. More particularly, embodiments of the invention pertain to managing processor context state. At least one embodiment of the invention introduces extended functionality to some prior art context state managing techniques in order to facilitate resource and performance efficiency when reading and updating context state information within a microprocessor.

An operating system ("OS") and/or user program typically uses a buffer or other area ("save area") in a memory structure, such as dynamic random access memory ("DRAM"), for saving context state during a context switch. Instruction set architectures may define one or more instructions to handle the storage of context state to memory or the restoration of context state from memory. For example, in one instruction set architecture, a first state management instruction ("XSAVE") may be used to store context state from a processor's registers to a memory, or a second state management instruction ("XSAVEOPT") may be used to store in-use (e.g., not set to an initial or default value) or modified (e.g., not changed since the last restoration of context state) context state from a processor's registers to a memory. A third state management instruction ("XRSTOR") may be used to restore context state from the memory to the processor's registers. The save area layout map may be defined in advance, such that XSAVE or XSAVEOPT stores the context state for any particular processor feature at the same fixed offset every time. For a processor that do not implement every particular feature and/or for an OS that does not enable every available feature, holes may be left in the save area for the unimplemented and/or un-enabled features. Typical operation of a processor may involve thousands of context switches (e.g., between software threads), each using memory space for a save area. Therefore, embodiments of the present invention provide for compacting holes out of the save area to avoid wasting memory space.

FIG. 1 illustrates information processing system 100, including memory 110 and processor 120, according to an embodiment of the present invention. System 100 may represent any type of information processing system, such as a server, a desktop computer, a portable computer, a set-top box, a hand-held device such as a tablet or a smart phone, or an embedded control system.

Memory 110, processor 120, and any number of other components not shown in FIG. 1 may be connected, coupled, or otherwise in communication with each other according to any known approach, such as directly or indirectly through one or more buses, point-to-point, or other wired or wireless interfaces or connections. Any components or other portions of system 100, whether shown in FIG. 1 or not shown in FIG. 1, may be integrated or otherwise included on or in a single chip (a "system-on-a-chip" or "SOC"), die, substrate, or package.

Memory 110 may be static or dynamic random access memory, flash memory, magnetic or optical disk memory, any other type of medium readable by processor 120, or any combination of such mediums. Memory 110 includes state save area 112 to save state of processor 120.

Processor 120 may be any type of processor, including a general purpose microprocessor, such as a processor in the Core® Processor Family, the Atom® Processor Family, or other processor family from Intel Corporation, or another processor from another company, or a special purpose processor or microcontroller. Although FIG. 1 shows only one such processor 120, system 100 may include any number of processors, including any number of multicore processors, each with any number of execution cores and any number of multithreaded processors, each with any number of threads, in any combination. As shown, processor 120 includes instruction hardware 122 and state management logic 124. Processor 120 may also include any other circuitry, structures, or logic not shown in FIG. 1.

Instruction hardware 122 may include any circuitry, logic, structures, and/or other hardware to fetch, receive, recognize, decode, interpret, and/or schedule instructions to be executed by processor 120. Processor 120 may operate according to an instruction set architecture that includes any number of instructions to support context state management. Embodiments of the present invention may be practiced with a processor having an instruction set architecture of a processor family from Intel® Corporation, using instructions that may be part of a set of context state management extensions to any existing instruction set architecture, or according to any other approach.

State management logic 124 is to perform state management operations, as described below. State management logic 124 may include any circuitry, logic, or other structures to perform the state management operations. For example, state management logic 124 may include microcode, state machine logic, programmable logic, or any other form of control logic to cause processor 120 to respond appropriately to state management instructions. To do so, state management logic 124 may refer to any form of hardware, software, or firmware, within processor 120 or within any device accessible or medium readable by processor 120, such as memory 110.

Also, state management logic 124 may include logic and datapaths to read, write, and move state information into, from, and between registers and other storage locations where state information may be stored for internal use and/or to be read by software running on processor 120, and logic to perform masking and other logical operations on bit vectors and/or representations of state information. State management logic 124 may be dedicated to state management or may by used, in whole, in part, and/or together with other logic, to perform other functions, operations, instructions, etc. in processor 120.

State management logic 124 may determine what operation to perform and how to perform the operation based on information provided by an instruction, associated with an instruction (e.g., held in a particular processor register when an instruction is issued, received, or executed), and/or related to other information accessible by state management logic 124. Any known approach to conveying this information from software to state management logic 124 may be used within the scope of the present invention, such as any combination of different instructions, different instruction formats, different operand types and locations, etc. For example, a state management instruction may include a field holding the information, the name of a register holding the information, and/or an address of a memory location holding the information. According to any of these approaches, or any other known approach, the information may be referred to as a "parameter" of the instruction.

State management logic 124 may operate based on signals from instruction hardware 122, and/or based on any parameters associated with a state management instruction, to cause processor 120 to execute portions of method embodiments of the present invention, such as method 300, as illustrated in FIG. 3. For example, control logic 124 may cause processor 120 to execute portions of method embodiments of the present invention by executing one or more micro-instructions or micro-operations in response to receiving a state management instruction.

In one embodiment of the present invention, a fourth state management instruction ("XSAVEC") may be used to store context state to a compacted save area. The save area layout may be customized to store the context state for any particular processor features without leaving gaps or holes in the layout. An OS or other software may inspect the save area to determine the features for which context state has been saved and/or to operate on the context state for particular features.

An XSAVEC instruction may have as a parameter a compaction mask to specify which features of context state are to be saved. For example, the compaction mask may be a bit vector determined by the concatenated contents of one or more processor registers (e.g., the EDX, ECX, EBX, and/or EAX registers), where each bit of the bit vector corresponds to a particular processor feature and a bit value of '1' may indicate that context state corresponding to the feature is to be saved and a bit value of '0' may indicate that context state corresponding to the feature is not to be saved.

Execution of an XSAVEC instruction causes context state corresponding to the bits set in the compaction mask to be stored in the save area with no gaps in the save area for context state corresponding to the other bits, such that the size of the save area may vary with each execution of the XSAVEC instruction. Furthermore, the location or offset of the context state for any particular feature or element may vary depending on the content of the compaction mask. Therefore, execution of the XSAVEC instruction may also cause the compaction mask to be saved, for example, in the 8 bytes starting at offset 520 in the save area (or the header of the save area).

In one embodiment, the compaction mask may independently specify which elements or features of context state are saved in connection with the execution of an XSAVE instruction. These embodiments may be desirable in an approach in which software may incrementally save context state. In other embodiments, the compaction mask may be logically or otherwise combined with another vector, bit-string, parameter, or other value in order to specify which elements or features of context state are saved in connection which the execution of an XSAVEC instruction.

For example, in one embodiment, the features or elements to be saved by an XSAVEC instruction may be specified by the bitwise logical AND of the compaction mask and a feature enabled mask, where the feature enabled masked may be set in connection with the execution of a fifth state management instruction ("XSETBV"). In one embodiment, XSETBV may be a privileged instruction that may be used by privileged software, such as an OS to specify or otherwise select which features from a set of available processor features are to be enabled. Therefore, context state for un-enabled features will not be saved by an XSAVE or XSAVEC instruction.

In one embodiment, a sixth state management instruction ("XGETBV") may be used by software to read or otherwise determine which features have been enabled. For example, XGETBV may be a non-privileged instruction to provide for non-privileged software to read the feature enabled mask. A leaf or subleaf (e.g., indicated by a particular value in a particular processor register when an XGETBV instruction is issued, received, or executed) which may cause the processor to return, instead of the feature enabled mask, a vector, bitstring, parameter, or other value that indicates which elements or features of context state are in an initialized state (e.g., their values are in an initial or default state). For convenience, this leaf or subleaf of XGETBV may be referred to as the feature-in-use leaf of XGETBV and the value may be referred to as the feature-in-use mask.

In one embodiment of the present invention, a seventh state management instruction ("XSAVEOPTC") may be used to store in-use or modified context state to a compacted save area. Again, the save area layout may be customized to store the context state for any particular processor features without leaving holes in the layout. An OS or other software may inspect the save area to determine the features for which context state has been saved and/or to operate on the context state for particular features.

Execution of an XSAVEOPTC instruction causes in-use or modified context state corresponding to the bits set in the compaction mask to be stored in the save area with no gaps in the save area for context state corresponding to the other bits, such that the size of the save area may vary with each execution of the XSAVEOPTC instruction. Furthermore, the location or offset of the context state for any particular feature or element may vary depending on the content of the compaction mask. Therefore, execution of the XOPTSAVE instruction may also cause the compaction mask to be saved, for example, in the 8 bytes starting at offset 520 in the save area (or the header of the save area).

A particular bit in the header of the save area (e.g., bit 63) may be designated and used to indicate whether the save area is compacted (e.g., corresponds to a save performed in connection with the execution of an XSAVEC or XSAVEOPTC instruction) or un-compacted (e.g., corresponds to a save performed in connection with the execution of an XSAVE or XSAVEOPT instruction). For example, bit 63 may be set during the execution of an XSAVEC or XSAVEOPTC instruction, and clear by default or cleared during the execution of an XSAVE or XSAVEOPT instruction). For convenience, this bit may be referred to as a compacted-save bit.

Figure 2:
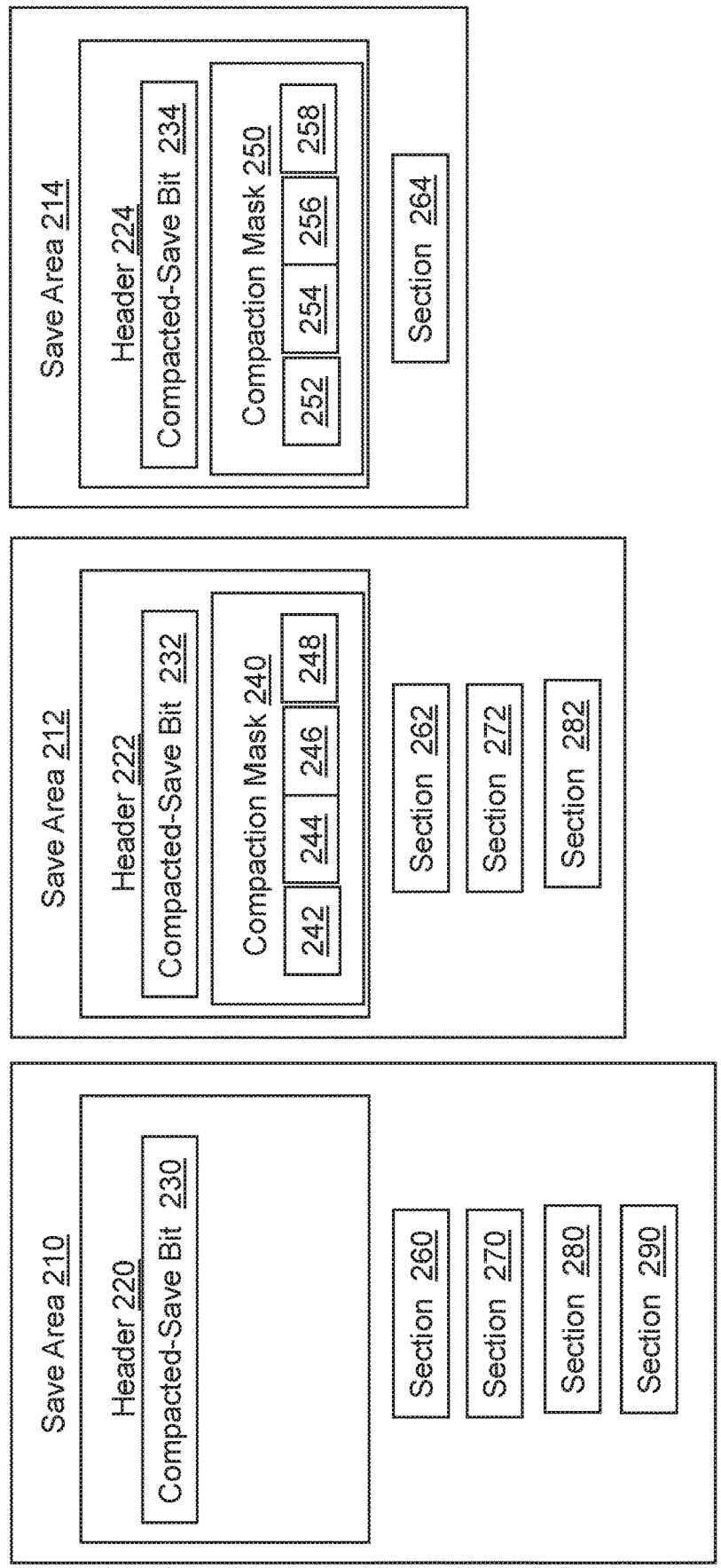
FIG. 2 illustrates an un-compacted save area and two compacted save areas according to an embodiment of the present invention.

FIG. 2 illustrates un-compacted save area 210, compacted save area 212, and compacted save area 214 according to an embodiment of the present invention. Each of un-compacted save area 210, compacted save area 212, and compacted save area 214 may represent a buffer or any other data structure or area at any address or location within a memory such as memory 110 in system 100. Un-compacted save area 210 may include a header 220 having a compacted-save bit 230 having a value of zero to indicate that the corresponding save area is un-compacted. Compacted save areas 212 and 214 may each include a header 222 and 224, respectively, each having a compacted-save bit 232 and 234, respectively, set to a value of one to indicate that the corresponding save area is compacted. Compacted save areas 212 and 214 may also each include a compaction mask 240 and 250, respectively, to indicate which features or elements are included in each compacted save area.

In the example embodiment of FIG. 2, a feature set of a processor may include four features. In un-compacted save area 210, context state for a first feature, a second feature, a third feature, and a fourth feature is saved in sections 260, 270, 280, and 290, respectively, where each of sections 260, 270, 280, and 290 may be located according to their particular offset from a base or other address of the save area. The format of save area of 210 is fixed, in other words, context for any particular feature is always saved at the same location within the save area and the size of the save area is constant.

In contrast, context state for any particular feature may be stored at or in a flexible or varying offset, location, or section of a compacted save area, and the size of the save area may vary and be smaller than that of a corresponding un-compacted save area. For example, in compacted save area 212, context state for the first feature, the third feature, and the fourth feature is saved in sections 262, 272, and 282, respectively, where section 262 is located at the same offset as section 260, section 272 is located at the same offset as section 270, and section 282 is located at the same offset as section 280, such that the size of compacted save area 212 may be smaller than that of un-compacted save area 210 because compacted save area 212 does not include a section located at the same offset as section 290. Compaction mask 240 includes bit 242 having a value of one to indicate that compacted save area 212 includes context state for the first feature, bit 244 having a value of zero to indicate that compacted save area 212 does not includes context state for the second feature, bit 246 having a value of one to indicate that compacted save area 212 includes context state for the third feature, and bit 248 having a value of one to indicate that compacted save area 212 includes context state for the fourth feature. Note that although context state for the third and fourth features is saved in compacted save area 212, neither is saved at the same offset in compacted save area 212 as it is in un-compacted save area 210.

To further the example, in compacted save area 214, context state for the third feature is saved in section 264, where section 264 is located at the same offset as sections 260, such that the size of compacted save area 214 may be smaller than that of un-compacted save area 210 and of compacted save area 212, because compacted save area 214 does not include sections located at the same offset as sections 270, 280, or 290. Compaction mask 250 includes bit 252 having a value of zero to indicate that compacted save area 214 does not include context state for the first feature, bit 254 having a value of zero to indicate that compacted save area 214 does not include context state for the second feature, bit 256 having a value of one to indicate that compacted save area 214 includes context state for the third feature, and bit 258 having a value of zero to indicate that compacted save area 214 does not include context state for the fourth feature. Note that although context state for the third feature is saved in compacted save area 214, it is not saved at the same offset in compacted save area 214 as it is in un-compacted save area 210 or compacted save area 212.

Embodiments of the present invention provide for a single instruction (e.g., XRSTOR) to be used to restore context state from either a compacted save area or an un-compacted save area. In one embodiment, execution of an XRSTOR instruction includes determining whether the save area is compacted or un-compacted by reading a compacted-save bit from the header of the save area, which may be set or cleared as described above. If the save area is compacted, then execution of an XRSTOR instruction may also include reading a compaction mask from the save area to determine which elements or features of context state are included in the compacted save area and their locations in the compacted save area. In one embodiment, the context state for elements or features that are not indicated by the compaction mask as being saved or otherwise present in the save area may be restored to an initial or default value. Therefore, software may define an area of any size (e.g., 64-bytes) that may be used to initialize any enabled context state.

In one embodiment, software may restore all context state for all enabled features to initial values without allocating any backing storage for these features, by issuing an XRSTOR instruction with the compaction mask set to all zeroes and the compacted-save bit set to one. An OS or other privileged software may enable particular features without allocating backing storage in a save area for those features, for example, on a per-thread basis. Then, non-privileged software may use the feature-in-use leaf of XGETBV to determine which features are in-use (e.g., having context state not in an initial state) so that it may allocate backing storage for those features on a dynamic or "just-in-time" basis. Therefore, embodiments of the present invention may provide for more efficient use of system memory in an information processing system.

FIG. 3 illustrates method 300 for context state management according to an embodiment of the present invention. Although method embodiments of the invention are not limited in this respect, reference may be made to elements of system 100 to describe the method embodiment of FIG. 3. Method 300 may refer to state management instructions by names that may be used according to one embodiment; in other embodiments, these instructions or similar instructions may have different names. Additionally, many associated actions and details may not be shown in method 300; for example, method 300 includes a context switch from a first thread to a second thread, then a context switch back to the first thread, but it does not show the saving of context for the second thread.

In box 310 of method 300, a processor is queried, e.g., by an OS issuing a processor identification ("CPUID") instruction with an appropriate request type and/or other parameters, to enumerate the features supported by the processor. In box 312, the OS or other privileged software enables a subset of those features.

In box 314, the OS issues an instruction ("XSETBV") to convey to the state management logic the subset of the features that are enabled. In one embodiment, XSETBV has a parameter to program a bit vector ("XFEATURE_EN-ABLED_MASK") to indicate which features are enabled, e.g., using one bit per feature that has a manageable state. A corresponding instruction ("XGETBV") may be used by software to read (FEATURE_ENABLED_MASK. The XGETBV instructions also may have a leaf to allow it to be used to read another bit vector that indicates which features are currently in use, i.e., their state values have changed since initialization. XSETBV may be a privileged instruction and XBVGET may be a non-privileged instruction.

In box 316, the processor is queried, e.g., by software issuing another instruction (e.g., "XSIZE"), to determine the size required for the state save area based on a bit vector or other parameter that specifies any subset of the set of features supported by the processor. This bit vector may be the same bit vector as the compaction mask described above, a logical combination of the compaction mask and any other bit vector, or any other bit vector. In box 318, software may allocate a portion of memory for a context state save area, where the size of the portion may be based on a value returned or otherwise provided by the XSIZE instruction.

In box 320, the processor may begin executing a first process of thread.

In box 330, in connection with a context switch from the first process or thread to a second process or thread, software may issue an instruction ("XSAVEC") to save the current context of a subset of the features supported by the processor. XSAVEC may have a parameter (a compaction mask) that provides for selectively controlling the saving of state. The parameter may be a bit vector, with one bit per feature, to select the features for which state should be saved. This bit vector may be combined with (FEATURE_ENABLED_MASK (e.g., with a logical AND operation) by state management logic, such that state is saved only for those features that are both selected and enabled.

In box 332, execution of the XSAVEC instruction may include setting a compacted-save bit or indicator in the save area header or elsewhere in the save area. In box 334, execution of the XSAVEC instruction may include saving the compaction mask in the save area header or elsewhere in the save area.

In box 336, execution of the XSAVEC instruction may include saving context state for each feature selected by the compaction mask or based on the compaction mask combined with the (FEATURE_ENABLED_MASK or other bit vector, such that any feature for which context state is not saved is compacted out of the save area.

In box 338, the context switch may be completed. In box 340, the processor may execute the second process or thread.

In box 350, in connection with a context switch back to the first process or thread, software may issue an instruction ("XRSTOR") to restore the context saved in box 336. In box 352, execution of the XRSTOR instruction may include reading a compacted-save bit from the save area header to determine whether the save area is compacted. If not, then in box 354, execution of the XRSTOR instruction includes restoring context state from an un-compacted save area. If so, then method 300 continues in box 360.

In box 360, execution of the XRSTOR instruction includes reading the compaction mask from the save area in order to determine which the subset of features for which context is to be restored and the offset within the save area of the context for each of the subset of features. In one embodiment, the offset for any particular feature may be determined based on an ordered list of features, where the offset may be based on the total save area size for all features ahead of the particular feature on the list, minus the save area for the features that have been compacted out.

In box 362, execution of the XRSTOR instruction includes restoring context state from the compacted save area for each feature for which context has been saved, according to the compaction mask or the compaction mask combined with the (FEATURE_ENABLED_MASK or other bit vector.

In box 364, execution of the XRSTOR instruction includes initializing context state for each feature which has been compacted out of the save area. In box 366, the context switch may be completed. In box 368, the processor may continue execution of the first process or thread.

Within the scope of the present invention, the method illustrated in FIG. 3 may be performed in a different order, with illustrated boxes omitted, with additional boxes added, or with a combination of reordered, omitted, or additional boxes. Many variations of method 300 and many other methods are possible within the scope of the present invention.

Embodiments or portions of embodiments of the present invention, as described above, may be stored on any form of a machine-readable medium. For example, all or part of method 300 may be embodied in software or firmware instructions that are stored on a medium readable by processor 120, which when executed by processor 120, cause processor 120 to execute an embodiment of the present invention. Also, aspects of the present invention may be embodied in data stored on a machine-readable medium, where the data represents a design or other information usable to fabricate all or part of processor 120.

Thus, embodiments of an invention related to compacted context state management have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
instruction hardware to receive and decode instructions comprising an XSAVE instruction, an XSAVEC instruction, and an XRSTOR instruction; and
execution hardware to support execution of the XSAVE instruction, the XSAVEC instruction, and the XRSTOR instruction, wherein:
execution of the XSAVE instruction is to include saving a processor state in an uncompacted format in an uncompacted save area, wherein the uncompacted format of the saved processor state is a fixed size with gaps between saved processor state elements of the saved processor state, the gaps corresponding to features of the processor state that are either: unimplemented, or not enabled, or both unimplemented and not enabled;
execution of the XSAVEC instruction is to include saving a subset of the processor state in a compacted format in a compacted save area, saving a compaction mask in the compacted save area, and setting a compaction bit to indicate that the subset of the processor state is saved in the compacted format, wherein the compacted format is a variable size according to the compaction mask without gaps between saved processor state elements of the saved subset of the processor state; and
execution of the XRSTOR instruction is to include determining, based on the compaction bit, whether the processor state is saved in connection with execution of the XSAVE instruction or the subset of the processor state is saved in connection with execution of the XSAVEC instruction and, in response to determining that the processor state is saved in connection with execution of the XSAVE instruction, restoring the processor state from the uncompacted save area, and, in response to determining that the subset of the processor state is stored in connection with execution of the XSAVEC instruction, reading the compaction mask from the compacted save area to determine which subset of features of the processor state is to be restored, and restoring the subset of the processor state from the compacted save area.

2. The processor of claim 1, further comprising a plurality of registers to store the processor state.

3. The processor of claim 2, wherein saving the processor state includes saving the processor state from the plurality of registers.

4. The processor of claim 2, wherein restoring the processor state includes restoring the processor state to the plurality of registers.

5. The processor of claim 1, wherein restoring the processor state includes restoring the processor state from the uncompacted format if the compaction bit indicates that the processor state is not saved in the compacted format.

6. The processor of claim 1, wherein restoring the processor state includes restoring the processor state from the compacted format if the compaction bit indicates that the processor state is saved in the compacted format.

7. The processor of claim 1, wherein the processor state is to be saved in a buffer.

8. The processor of claim 7, wherein the compaction bit is included in the buffer.

9. The processor of claim 1, wherein the processor state is to be saved in a save area.

10. The processor of claim 9, wherein the compaction bit is included in the save area.

11. The processor of claim 1, wherein the XSAVE instruction, the XSAVEC instruction, and the XRSTOR instruction are state management instructions.

12. The processor of claim 1, wherein the fixed size of the uncompacted format of the saved processor state is defined in advance of executing the XSAVE instruction such that a context state for every processor feature is stored at a same fixed offset each time the XSAVE instruction is executed.

13. The processor of claim 1, wherein the subset of the processor state, the compaction mask, and the compaction bit are saved in the compacted save area, the compacted save area having a size smaller than the fixed size of the uncompacted format of the saved processor state.

14. The processor of claim 1, wherein:
the processor includes a plurality of features;
each of the saved processor state elements of the saved processor state corresponds with a context of a corresponding one of the plurality of features of the processor; and the uncompacted format of the saved processor state is the fixed size such that the context of each of the plurality of features of the processor is always saved at a same location within the uncompacted save area when the XSAVE instruction is executed.

15. The processor of claim 14, wherein the subset of the processor state, the compaction mask, and the compaction bit are saved in the compacted save area, the compacted save area having a size smaller than the fixed size of the uncompacted format of the saved processor state.

* * * * *